H. P. TAYLOR.
AUTOMOBILE TRANSMISSION LOCK.
APPLICATION FILED NOV. 30, 1917.
1,281,704. Patented Oct. 15, 1918.
2 SHEETS—SHEET 1.
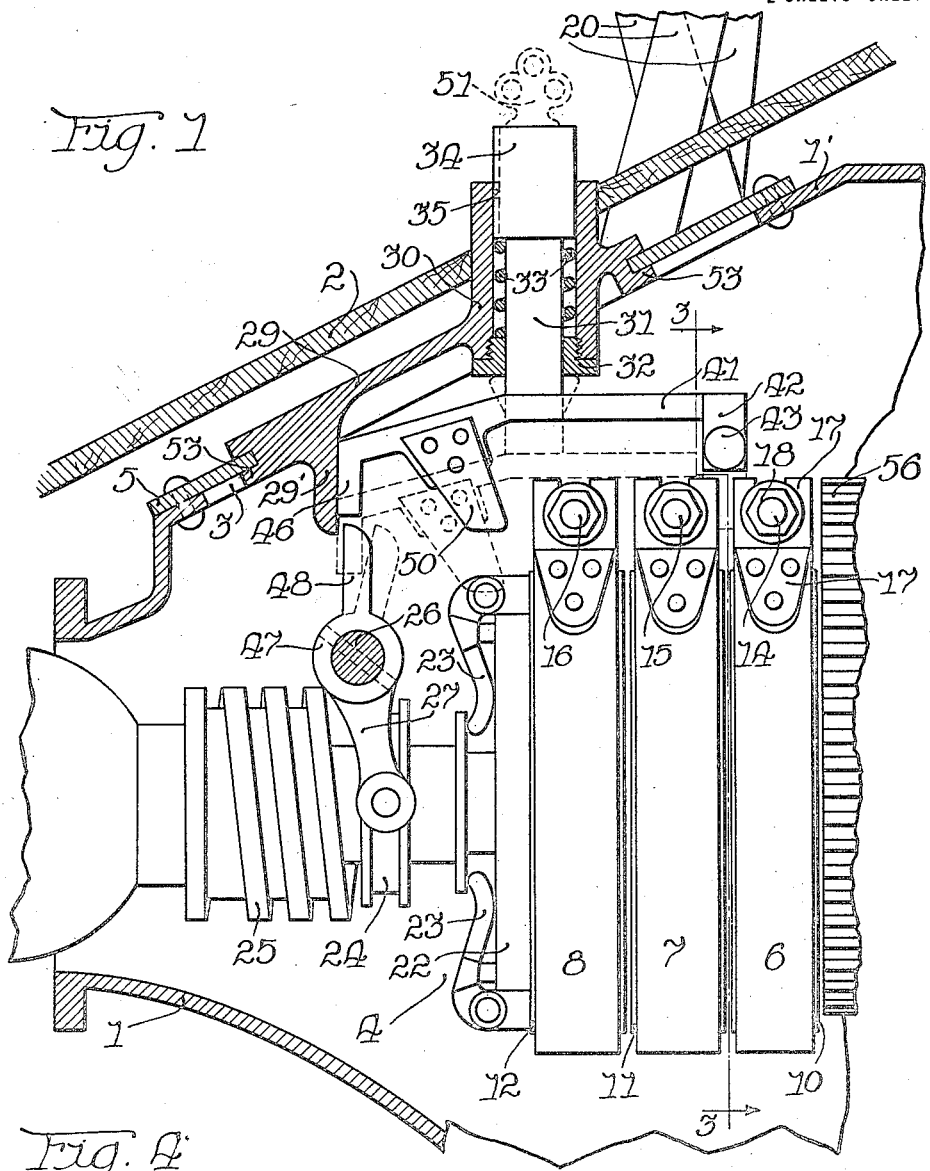
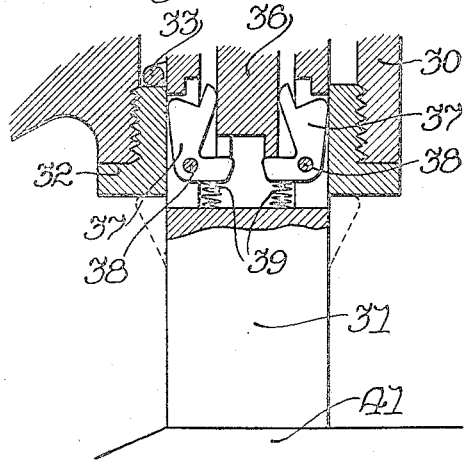
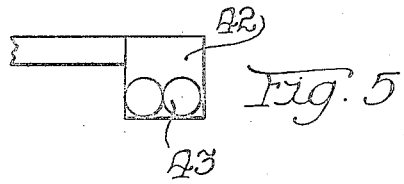
Inventor
Harry P. Taylor
By Brown, Hanson & Boettcher
Attorneys H. P. TAYLOR.
AUTOMOBILE TRANSMISSION LOCK.
APPLICATION FILED NOV. 30, 1917.
1,281,704. Patented Oct. 15, 1918.
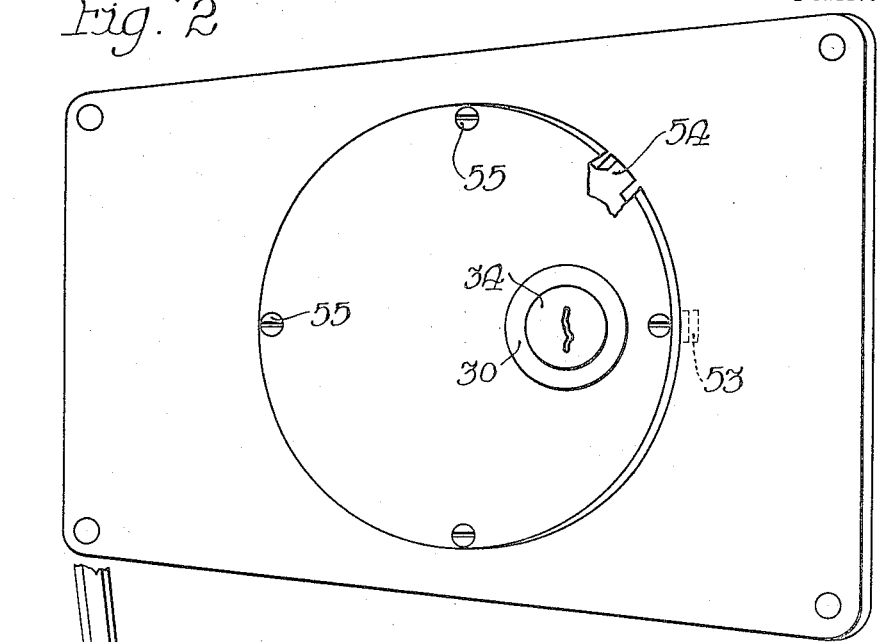
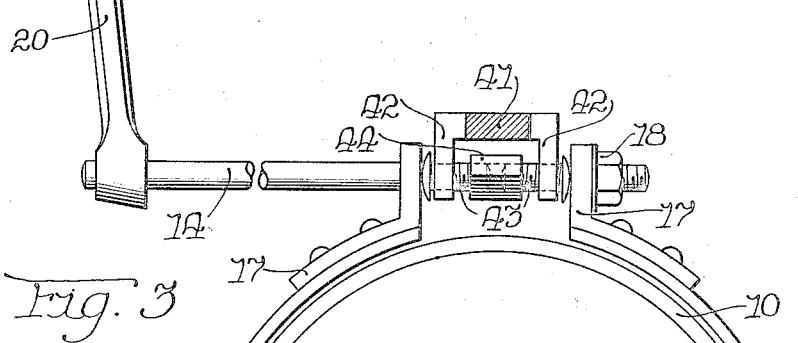

UNITED STATES PATENT OFFICE.

HARRY P. TAYLOR, OF LOS ANGELES, CALIFORNIA.

AUTOMOBILE-TRANSMISSION LOCK.

1,281,704.  Specification of Letters Patent.  Patented Oct. 15, 1918.

Application filed November 30, 1917. Serial No. 204,530.

*To all whom it may concern:*

Be it known that I, HARRY P. TAYLOR, a citizen of the United States, residing at Los Angeles, in the county of Los Angeles and State of California, have invented a certain new and useful Improvement in Automobile-Transmission Locks, of which the following is a full, clear, concise, and exact description, reference being had to the accompanying drawings, forming a part of this specification.

My invention relates to automobile transmission locks, and is particularly concerned with a locking device for planetary gear transmissions, such as are used on light automobiles of a popular and well known type.

My lock is inclosed within the transmission housing and operates directly upon the transmission mechanism, and is not to be confused with locks operating upon the transmission controls.

The latter type have not the security essential to such a device, due to the fact that they are so accessible that they can be readily broken by the thief or can be circumvented by disconnection of some of the links and levers between controls and the transmission gearing, whereby the transmission gearing can be operated, irrespective of the locked condition of the controls.

It is contrary to the fire and traffic ordinances of many cities to lock a car immovably, and accordingly, I have arranged my device to lock the transmission in neutral position, whereby the car may be pushed freely, as for instance away from in front of a building. The car is prevented from running under its own power by positively locking all the positions of the transmission mechanism in neutral, namely, low speed, high speed and reverse, this action being accomplished by a single locking member set in locked position by one simple operation of the driver.

In addition to locking the transmission in neutral, the setting of the lock is arranged to render operable an alarm which is intended as a deterrent against towing of the car by thieves. This alarm gives an audible signal when the car is moved, indicating that it is not in the hands of the owner or authorized driver.

In the practice of my invention I contemplate applying my lock in the transmission housing, in the nature of an attachment or accessory. The lock is so constructed that this application can be easily and cheaply performed without necessitating alteration of the transmission housing nor the employment of skilled labor. It is to be understood that the invention may be employed as permanent equipment.

I do not intend to be limited strictly to the details shown as modifications are contemplated within the scope of my invention. In the accompanying drawings wherein I have illustrated one embodiment of my invention—

Figure 1 is a vertical sectional view through the transmission housing of a car of well known make showing my improved lock applied thereto;

Fig. 2 is a plan view of the main cover of the housing;

Fig. 3 is a sectional view taken on the line 3—3 of Fig. 1;

Fig. 4 is a detail section of the plunger lock; and

Fig. 5 is an end view of a modified form of locking member for the brake bands.

The transmission housing 1 is situated immediately behind the engine and directly under the sloping floor board 2.

The sloping upper portion 1' of the housing 1 has an opening 3 therethrough, to afford access to the planetary transmission 4, the opening 3 normally being closed by the door or cover 5.

The planetary transmission 4 is of the typical Ford construction, comprising the planet gears 56 and the brake bands 6, 7 and 8 encircling individual brake drums 10, 11 and 12, respectively. These brake drums have connection through sleeves with central gears, around which the planet gears 56 revolve. The motion of the planet gears 56, and indirectly the motion of the car, is controlled by contraction of either of the brake bands, 6, 7 upon its respective drum. Contraction of the band 6 drives the car backward, and contraction of the band 7 drives the car slowly forward. The drum 12 revolves with the propeller shaft of the car and the band 8 thereupon functions as a propeller shaft brake.

Pedal shafts 14, 15 and 16 extend transversely through one side of the housing 1 and have operative engagement with the brake bands 6, 7 and 8, respectively.

In Fig. 3 I have illustrated the pedal shaft 14 and the brake band 6 in side elevation. The ends of the band 6 have riveted thereto the vertically extending lugs 17—17 which are slotted, as shown in Fig. 1, to receive the pedal shaft 14. A nut 18 threads upon the end of the pedal shaft 14 and engages the right hand lug 17, retaining that end of the band 6 in operative engagement with the drum 10 and affording an adjustment for taking up wear of the brake band 6. That portion of the pedal shaft 14, intermediate the opposing lugs 17—17, is provided with a thread of relatively steep pitch, which threads into the left hand lug 17. Slight rotation of the shaft 14 draws the two lugs 17—17 together, and tightens the brakeband 6 upon the brake drum 10, stopping the rotation of the drum and resulting in a reverse drive of the car. The shafts 14, 15 and 16 have suitable foot pedals 20 mounted thereon which extend up above the floor board 2 for operation by the driver.

A disk clutch is housed within the end brake drum 12, as shown at 22 in Fig. 1, and is adapted to be compressed by clutch fingers 23, pivoted on the drum 12. These clutch fingers bear against a collar on the spool 24, which is subjected to the thrust of the clutch spring 25. The clutch spring 25, the spool 24 and the fingers 23 all revolve in unison with the propeller shaft, the clutch spring 25 always tending to engage the disk clutch through the medium of the fingers 23. A clutch control shaft 26 extends transversely through the casing 1, similarly to the band brake shafts, and carries a fork 27 engaging in the spool 24. The operation of the clutch will be apparent, slight rotation of the clutch control shaft 26 either way controlling the spring pressure against the clutch fingers 23. The shaft 26 is subject to a dual control from both the foot pedal 20 controlling the low speed band brake 7, and from a hand lever. When the clutch is engaged, a direct drive obtains from the engine to the rear axle, resulting in high speed of the car.

From the foregoing description it will be apparent that by preventing the contraction of the bands 6 and 7, and by relieving the clutch fingers 23 of the pressure of the clutch spring 25, the transmission is placed in an inoperative condition. This is attainable by the locking mechanism of my invention as set out below, although I do not wish to be limited to the details shown, the scope of the invention being ascertainable from the appended claims.

The main cover 5 on the transmission housing 1 is provided with a circular opening, over which fits the disk cover 29. The disk cover 29 is formed with an integral hollow boss 30, within which the plunger 31 is arranged to reciprocate. A cap nut 32 is threaded into the lower end of the boss 30 to guide the plunger 31 and to confine the coil spring 33 between it and the enlarged portion 34 of the plunger 31. The plunger is suitably keyed against rotation in the boss 30 as shown at 35.

The enlarged portion 34 is provided with a pin and tumbler lock of the Yale pattern which extends down inside of the plunger 31 and has a cam shaft 36 (Fig. 4) bearing cams at the lower end thereof for engaging the locking pawls 37. These locking pawls 37 are formed in the shape of bell crank levers pivoted at 38 in the plunger 31, their inner arms being engaged by the cams on the lower end of the shaft 36 and their outer ends being adapted to move out laterally through the slot in which they are mounted when the plunger is pushed downward and to engage the under side of the cap nut 32 thereby to lock the plunger in its lower position. Springs 39 engage the inner arms of the locking pawls 37, tending to swing them out of the slots in which they are mounted, see Fig. 4. The plunger projects up above the floor board 2, in convenient position to be depressed by the foot of the operator.

A locking bar 41 is secured to the lower end of the plunger 31 and is provided at its right hand end with two downwardly extending arms 42, through which thread screws 43 as best shown in Fig. 3. These screws have large rounded heads adapted to engage the inner faces of the lugs 17 of both brake bands 6 and 7 when the plunger 31 is depressed.

The arms 42 and screws 43 constitute a blocking member for insertion between the lugs 17 to prevent contraction of the brake bands 6 and 7. The screws 43 are threaded in opposite directions and have inner ends threading into a sleeve nut 44 which serves to lock the screws in any adjusted position.

To the left of the plunger 31 the locking bar 41 is inclined downwardly and has a vertically depending lug 46 in sliding engagement with the reinforcing web 29' which is cast integral on the disk cover 29. A hub 47 is rigidly pinned to the clutch control shaft 26 and this hub has a finger 48 thereon, extending up into proximity to the lug 46 of the locking bar 41. The finger 48 may be formed on the hub 47 as illustrated or might be made part of a special fork 27, either of which would be mounted on the clutch control shaft 26 upon installation of the transmission lock.

With the clutch in disengaged position, the finger 48 assumes the position shown in dotted lines in Fig. 1 and upon descent of the lug 46, the finger 48 is retained in this position, thereby locking the clutch in disengaged position. With the locking bar 41 retracted and the clutch in an engaged position, the finger 48 lies immediately below the lug 46, and by blocking the descent of the lug 46, serves to apprise the driver that the clutch is engaged and will require disengagement before the transmission lock can be set. The reinforcing web 29' receives the thrust of the finger 48, imparted thereto by the clutch spring 25. Were the lug 46, of the locking bar 41, not thus reinforced the plunger 31 would be subjected to a lateral torsion from the clutch spring 25 which would hamper its free reciprocation in the boss 30.

A tongue or reed 50 is secured to a lateral face on the locking bar 41, and extends down into proximity to the clutch fingers 23 pivoted on the brake drum 12. The reed 50 is of a flexible material and upon depression of the plunger 31 the reed will be projected into the path of the plurality of clutch fingers 23. As previously explained, the drum 12 and clutch fingers 23 always rotate in unison with the propeller shaft and it will be apparent that when the transmission lock is set, any movement of the car will result in rapid vibration of the reed 50, giving an alarm to indicate that the automobile is being used in an unauthorized manner.

When the owner or authorized driver of the car wishes to unlock the transmission, the proper key which is shown in dotted lines in Fig. 1, is inserted into the barrel of the tumbler lock and the shaft 36 turned until the cams on the lower end thereof bring the locking pawls 37 within the slots in which they are mounted and the spring 33 moves the plunger 31 upward, disengaging the brake drums 6 and 7, the clutch control shaft 26 and withdrawing the reed 50 from engagement with the clutch fingers 23.

In my copending application, Serial No. 174,727, filed June 14th, 1917, I have disclosed and specifically claimed an alarm mechanism similar to the reed 50, applied to a sliding gear transmission. Said application is concerned with a sliding gear transmission lock and therein I have illustrated a cover for the transmission housing which is removable or irremovable, depending upon the condition of the transmission lock. I utilize this feature in a modified form in connection with the disk cover 29 of the present application, which I shall now proceed to describe.

As shown in Figs. 1 and 2, the disk cover 29 is provided with a plurality of hook shaped lugs 53 formed on the lower face thereof, which are adapted to be inserted through slots 54 cut in the periphery of the circular opening in the main cover 5. When the disk cover 29 is revolved slightly, the lugs 53 and slots 54 pass out of registration and the disk cover 29 is securely locked to the main cover 5 through the engagement of the hook shaped lugs 53 with the under surface of the main cover 5.

Machine screws 55 thread into holes in the disk cover 29 and main cover 5, which holes are positioned to coincide when the lugs 53 and slots 54 are out of registration and when the boss 30 and the locking bar 41 are in the positions illustrated in Figs. 1 and 2. When the locking bar 41 and the screws 43 carried thereby have been thrust down between the ends of the brake bands 6 and 7, it is impossible to revolve the disk cover 29 to releasable position, due to the eccentric disposal of the plunger 31 in the disk cover 29 and the keyed connection between the plunger 31 and boss 30.

Thus the removal of the disk cover 29 is made conditional upon the position of the locking bar 41.

To remove the locking unit, the proper key 51 is first inserted in the tumbler lock in the plunger 31, the pawls 37 drawn within the confines of the plunger 31 and the locking bar retracted to a non-locking position. The disk cover 29 is then revolved to bring the slots 54 and lugs 53 in registration, the cover 29 is lifted to clear the lugs and the entire unit is then withdrawn diagonally to enable the locking bar 41 to pass through the confines of the circular opening in the main cover 5.

In Fig. 5 I have shown a modified construction wherein the arms 42 of the locking bar 41 are made sufficiently wide to receive two sets of screws 43, for the two brake bands 6 and 7. This provision of individual sets of screws 43 for each of the bands 6 and 7, might be considered preferable to a single pair of screws 43, to take care of different spacings between the inner faces of opposing lugs 17—17, which might result from different adjustments due to unequal wear between the bands 6 and 7.

The first operation to be performed in the installation of my improved lock is the mounting of the finger 48 upon the clutch control shaft 26 either through the employment of the hub 47 or a special fork 27, as previously described. The main plate 5 originally in service on the transmission housing 1 is discarded and my modified cover 5 is substituted therefor. The sole difference between the cover discarded and the cover substituted is in the provision of the circular opening for receiving the disk cover 29. The new cover 5 is riveted or otherwise suitably secured to the housing 1, access to the interior of the housing 1 being afforded by the circular openings referred to. Obviously it is imperative that the cover 5 be so secured to the housing 1 as to prevent removal thereof without first gaining access to the interior of the housing. Bolts having round heads for the outside of the cover 5 might be employed. The placing of the disk cover 29 will be apparent from the preceding description.

I do not intend to be limited to the details shown or described and do not intend the invention to be limited to the particular transmission with which I have illustrated and described my invention.

I claim:

1. In combination, a housing, a planetary transmission therein, a cover on said housing, and locking mechanism being adapted to lock said transmission in a predetermined condition, said locking mechanism also locking said cover to said housing.

2. In combination, a housing, a planetary transmission therein, a cover on said housing, and locking mechanism supported on said cover, said locking mechanism being adapted to lock said transmission and to lock said cover to said housing.

3. In a transmission lock, a housing, a planetary transmission therein having brake drums, brake bands adapted to be contracted on said brake drums to control said transmission, a plunger supported by said housing, a controlling member carried on said plunger, said controlling member being adapted to be inserted between the ends of said brake bands when said plunger is operated and means for locking the plunger.

4. In combination, a housing, a transmission gearing therein, contracting bands adapted by their operation to control said transmission gearing, a removable cover on said housing and locking mechanism carried on said cover, said locking mechanism being adapted to control said bands to prevent their contraction, removal of said cover being controlled by said locking mechanism.

5. In combination, a housing having transmission gearing therein, contracting bands and a shaft adapted by their operation to control said transmission gearing, a removable cover on said housing, and locking mechanism carried on said cover, said locking mechanism adapted to prevent the operation of said bands and said shaft.

6. In a transmission lock, a housing, a planetary transmission therein, control means for said transmission, said control means being operable to place said transmission in a plurality of driving ratios, and locking mechanism operating upon said control means within said housing, said locking mechanism arranged to prevent said control means from placing said transmission in any driving ratio.

7. In a transmission lock, a housing, a planetary transmission therein, control means for said transmission, said control means having a plurality of control positions corresponding to different driving ratios of said transmission, and locking mechanism within said housing adapted to lock said control means.

8. In a transmission lock, a housing, a planetary transmission therein, control means for said transmission, said control means having a plurality of control positions corresponding to different driving ratios of said transmission, and locking mechanism within said housing for locking said control means, said locking mechanism being inoperative when said control means is in a control position.

9. In a transmission lock, a housing, a planetary gear set therein, brake bands adapted to be contracted on brake drums to control said planetary gears, means within said housing for preventing contraction of said bands, and locking means extending through said housing for operating said first means.

10. In a transmission lock, a housing, a planetary gear set therein, brake bands adapted to be contracted on brake drums to control said planetary gears, blocking means within said housing adapted to be thrust between the ends of said brake bands to prevent their contraction, and a plunger passing through said housing, and being adapted to operate said blocking means, said plunger having locking means.

11. In a transmission lock, a housing, a planetary transmission therein, bands adapted to be contracted on rotating drums to control said transmission, a shaft adapted to control said transmission, said shaft having an operative and inoperative position corresponding to similar positions of said transmission, and locking mechanism within said transmission housing adapted to prevent contraction of said bands and to retain said shaft in its inoperative position.

12. In combination, a transmission, contracting bands adapted to control said transmission, and locking mechanism adapted to engage said bands to prevent their contraction.

13. In combination, a transmission, bands adapted to be contracted and thereby control said transmission, a shaft for controlling said transmission, and locking mechanism adapted to engage said bands to prevent their contraction and to hold said shaft in a predetermined position.

14. In combination, a transmission, frictional bands adapted to control said transmission, and locking mechanism adapted to engage said frictional bands to prevent their operation.

15. In combination, a housing having a planetary transmission therein, control means for said transmission, and locking mechanism within said housing adapted to lock said control means.

16. In combination, a housing having a planetary transmission therein, and locking mechanism within said housing adapted to lock said transmission.

17. In a transmission lock, a housing, a planetary transmission therein, brake bands adapted to be contracted on brake drums to control said transmission, a clutch shaft for controlling said transmission, a projection on said clutch shaft, a cover for said housing, a plunger lock in said cover, a locking member supported on said plunger lock, said locking member adapted to move between the ends of said brake bands to prevent their contraction and to engage said projection on said clutch shaft to hold the latter in a predetermined position.

18. In an automobile transmission lock, a planetary transmission, a propeller shaft in constant driving relation with the driving wheels of the automobile, locking mechanism for locking said planetary transmission in neutral position, and an alarm mechanism adapted to be set when said locking mechanism is set, said alarm mechanism operating when said propeller shaft revolves.

19. In an automobile transmission lock, a planetary transmission, a clutch member in said transmission, a propeller shaft connected to said clutch member, said propeller shaft being in constant driving engagement with the driving wheels of the automobile, locking mechanism for locking said transmission in neutral position, and an alarm mechanism adapted to be set when said locking mechanism is set, said alarm mechanism coöperating with said clutch member and arranged to sound when the latter revolves.

20. In a transmission lock, a housing having a transmission therein, a cover for said housing, lugs on said cover adapted to register with slots in said housing to permit removal of said cover, locking mechanism for locking said transmission in neutral, said locking mechanism when set holding said slots and said lugs out of registration.

In witness whereof I hereunto subscribe my name this 20th day of November, A. D. 1917.

HARRY P. TAYLOR.